United States Patent [19]

Lee

[11] Patent Number: 5,315,391
[45] Date of Patent: May 24, 1994

[54] PIP MAIN AND SUBSCREEN SELECTION FROM AMONG TV, BS, AND VCR PLAYBACK SIGNALS

[75] Inventor: Jun H. Lee, Seoul, Rep. of Korea

[73] Assignee: Samsung Electronics Corporation, Kyungki-do, Rep. of Korea

[21] Appl. No.: 989,591

[22] Filed: Dec. 11, 1992

[30] Foreign Application Priority Data

Dec. 11, 1991 [KR] Rep. of Korea ............... 91-22626

[51] Int. Cl.⁵ .................. H04N 5/44; H04N 5/272; H04N 5/268; H04N 9/74
[52] U.S. Cl. .......................... 348/553; 348/554; 348/563
[58] Field of Search ........... 358/188, 183, 181, 191.1, 358/194.1, 254, 189, 22 PIP, 22; H04N 5/44, 5/262, 5/272, 5/268, 9/74

[56] References Cited

U.S. PATENT DOCUMENTS

| | | | |
|---|---|---|---|
| 4,488,179 | 12/1984 | Krüger et al. | 358/181 |
| 4,845,564 | 7/1989 | Hakamada et al. | 358/181 |
| 4,949,179 | 8/1990 | Hosono | 358/183 |
| 5,014,349 | 5/1991 | Kubo et al. | 358/188 |
| 5,031,044 | 7/1991 | Canfield et al. | 358/183 |
| 5,138,455 | 8/1992 | Okumura et al. | 358/22 |
| 5,161,019 | 11/1992 | Emanuel | 358/191.1 |

FOREIGN PATENT DOCUMENTS 63-299582 12/1988 Japan .

Primary Examiner—Victor R. Kostak
Assistant Examiner—John W. Miller
Attorney, Agent, or Firm—Sughrue, Mion, Zinn, Macpeak & Seas

[57] ABSTRACT

A TV receiver with built-in multiple functions such as TV, PIP, and VCR functions, is disclosed. The TV receiver processes a PIP signal in response to switching control by a microcomputer without using a separate tuner for PIP processing, and causes picture and audio signals to be selected for main and subscreen displays by controlling switches using a single microcomputer.

2 Claims, 5 Drawing Sheets

Fig. 1B

| Block | Description |
|---|---|
| 1 | BROADCASTING SATELLITE (BS) ANTENNA |
| 2, 3 | CONVERTER |
| 4 | INTERMEDIATE FREQUENCY |
| 5 | FM DEMODULATION CIRCUIT |
| 6 | SOUND TRAP |
| 7 | DE - ENF |
| 8 | DIFFUSED SIGNAL REMOVED |
| 9 | PICTURE SIGNAL AMPLIFICATION |
| 10 | VIDEO SELECTOR |
| 11 | LOW PASS FILTER |
| 12 | 4-PHASE DDSK CIRCUIT |
| 13 | PCN DEMODULATOR |
| 14 | REMOTE CONTROLLER (TRANSMITTER) |
| 15 | REMOTE CONTROLLER DECODER |
| 16 | CONTROL MICROCOMPUTER |
| 17, 18 | D/A CONVERTER |
| 19 - 22 | LOW PASS FILTER |
| 23 | AUDIO SELECTOR |
| 24 | AGC CIRCUIT |
| 25 | AFT |
| 26 | CHANNEL SELECTING CONTROLLER |
| 27 | VHF TV ANTENNA |
| 28 | VHF TV TUNER |
| 29 | IF AMP |
| 32 | CRT |
| 33 | INTERFACE |
| 34 | CHROMINANCE OUTPUT |
| 28-36 | TELEVISION RECEIVER |
| 37 | DEMODULATING PART |
| 38 | SOUND MULTIPLEXING DEMODULATOR |
| 39 | SOUND DISPLAY CIRCUIT |
| 40 | VF CONTROLLER |
| 41 | SOUND AMPLIFIER |
| 42, 43 | SPEAKER |
| 44 | MANIPULATION KEY |
| 45 | PLL PRESCALER |
| 46 | POWER SOURCE CIRCUIT |
| 49 | CHARACTER GENERATOR |

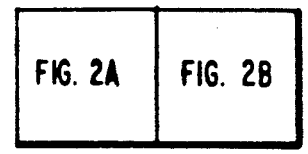
FIG. 2
FIG.2A
PRIOR ART
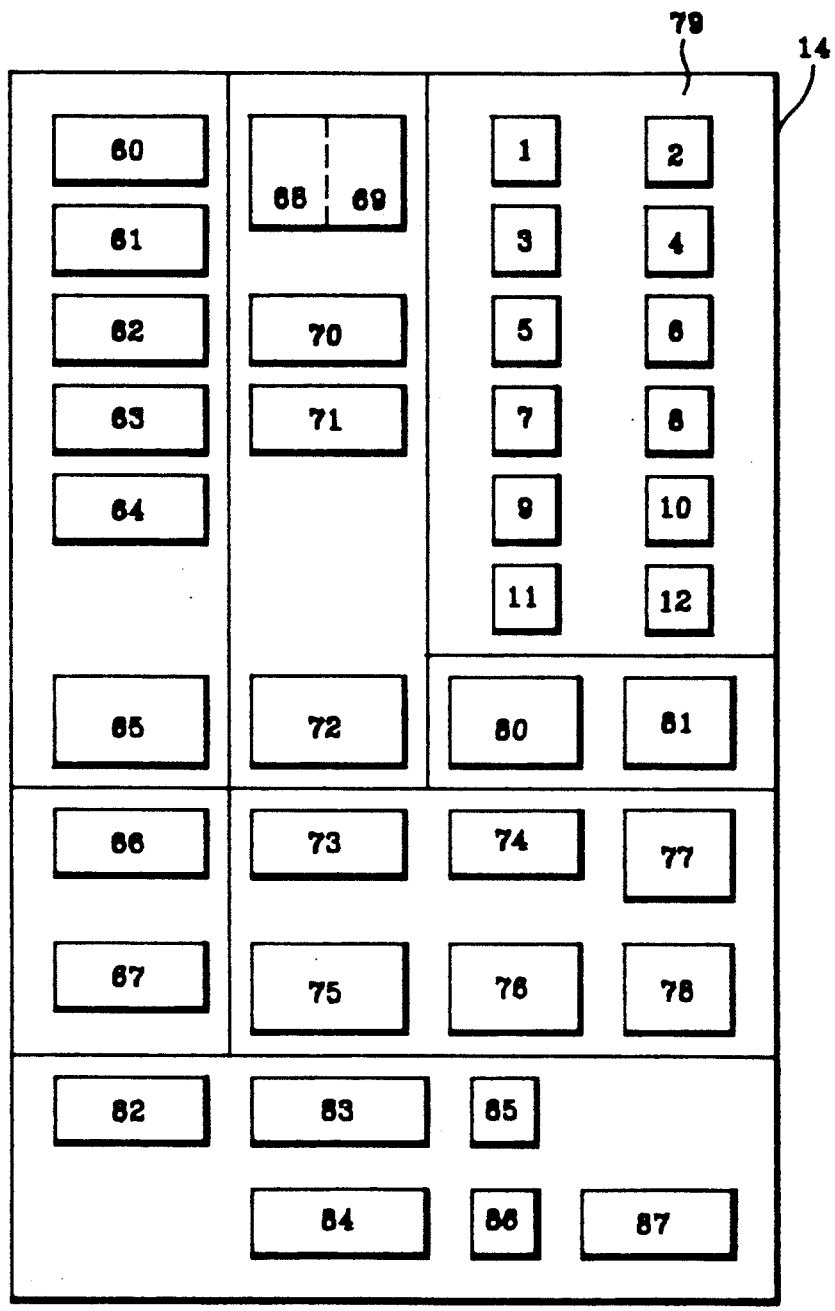

Fig. 2B

| Block | Description |
|---|---|
| 60 | POWER BUTTON |
| 61 | TV BUTTON |
| 62 | VIDEO 1 BUTTON |
| 63 | VIDEO 2 BUTTON |
| 65 | PICTURE CUT |
| 66 | (UPPER) CONSENT BUTTON |
| 67 | (LOWER) CONSENT BUTTON |
| 72 | TIMER DISPLAY BUTTON |
| 79 | CHANNEL BUTTON |
| 82 | TIME SET BUTTON |
| 83 | TIMER ON |
| 84 | TIMER OFF |
| 85 | HOUR BUTTON |
| 86 | MINUTE BUTTON |
| 87 | SETTING BUTTON |

PIP MAIN AND SUBSCREEN SELECTION FROM AMONG TV, BS, AND VCR PLAYBACK SIGNALS

BACKGROUND OF THE INVENTION

Korean Patent Application 91-22626, filed on Dec. 11, 1991, is incorporated herein by reference.

The present invention relates to a TV receiver with built-in multiple functions, and more particularly, to a TV receiver incorporating a broadcasting satellite (hereinafter, termed "BS") decoder, a picture in picture feature (hereinafter, termed "PIP") and a video cassette recorder (hereinafter, termed "VCR"). The functions of these features are capable of being performed with a minimum number of tuners and a microcomputer (hereinafter, termed "MICOM").

Generally, consumer audio and video products tend to be complex; i.e. the product contains its related functions and devices internally. In the case of a TV receiver, it is becoming common to include therein a built-in BS decoder, a built-in VCR, and/or built-in PIP.

However, in case of a TV receiver with built-in BS decoder, PIP and VCR, it has been necessary to incorporate separate tuners for PIP functioning, BS decoding and TV reception, respectively, so that the circuit becomes complicated, and the cost of the product becomes high.

Japanese Patent Publication No. 63-299582 illustrated in FIG. 1, herein a TV receiver which includes BS and terrestrial broadcasting and discloses a technology providing a simple operation using a single remote controller.

The conventional receiver comprises an electric power source, a remote control decoder 15 supplied with power from the electric power source, a control MICOM 16, a character generator 49 coupled to the control MICOM 16 in accordance with a controlling signal from a remote controller 14, and a TV/Character interface circuit 33 coupled to the character generator 49.

The system is capable of presenting a clock display and a channel number display and is capable of inputting at least a TV picture signal and a BS picture signal to a video selector and picture cutting circuit at the same time. The arrangement of the video selector, picture cutting circuit and the TV/Character interface circuit 33, sequentially, results in a receiver that receives BS and terrestrial broadcasting and is capable of receiving simply BS and terrestrial broadcasting by a remote controller.

The receiver can receive a signal of BS and TV broadcasting, but it does not include diclosure of a signal processing technique for VCR and PIP. Accordingly, the prior art TV receiver does not match the trend of increasingly complex products being generally marketed at present.

SUMMARY OF THE INVENTION

The present invention overcomes the above shortcomings of the prior art and provides a TV receiver with built-in multiple functions. A TV receiver is provided incorporating BS decoder, PIP, and VCR functions with only two tuners for receiving BS and TV signals, and performing pertinent switching according to the control of a MICOM, and thus the circuit becomes simple, and the cost of the product is reduced.

In order to carry out the latter objects according to the present invention, there are provided a TV signal processing section for processing TV signals through a TV tuner; a PIP signal processing section for processing a PIP signal; a BS signal processing section for processing a BS signals from a BS tuner; a VCR signal processing section for processing a signal of a VCR, and a MICOM for controlling each system block; a TV main screen selection switch coupled to the TV signal processing section and the BS signal processing section and the VCR signal processing section and the MICOM, causing a signal to be displayed on the TV main screen by virtue of selecting a signal among the TV picture signal, the BS picture signal and the VCR playback picture signal according to the control of the MICOM; a TV screen selection switch coupled to the TV main screen selection switch and PIP signal processing section and MICOM, causing a PIP screen to be displayed within the TV main screen, which is selected according to the control of the MICOM; a VCR recording signal selection switch for selecting a signal to be recorded on the VCR after selecting a TV main signal or subscreen signal according to the control of the MICOM; an audio output/recording section for outputting the audio signal of the TV main or subscreen and for selecting the audio signal to be recorded on VCR according to the control of the MICOM; and an audio output switch coupled to the TV signal and the BS signal and the VCR signal processing section and the MICOM, for providing the audio signal of TV main or subscreen according to the control of the MICOM.

BRIEF DESCRIPTION OF THE DRAWINGS

Further objects and advantages of the invention can be more fully understood from the following detailed description taken in conjunction with the accompanying drawings in which;

FIGS. 1, 1A and 1B are diagrams of a conventional TV with a built-in BS receiver;

FIGS. 2, 2A and 2B represent a remote controller for controlling the receiver of FIG. 1.

DESCRIPTION OF THE PREFERRED EMBODIMENT

Hereinafter, a preferred embodiment of the present invention will be described in detail with reference to the accompanying drawings.

Figures 1, 1A:
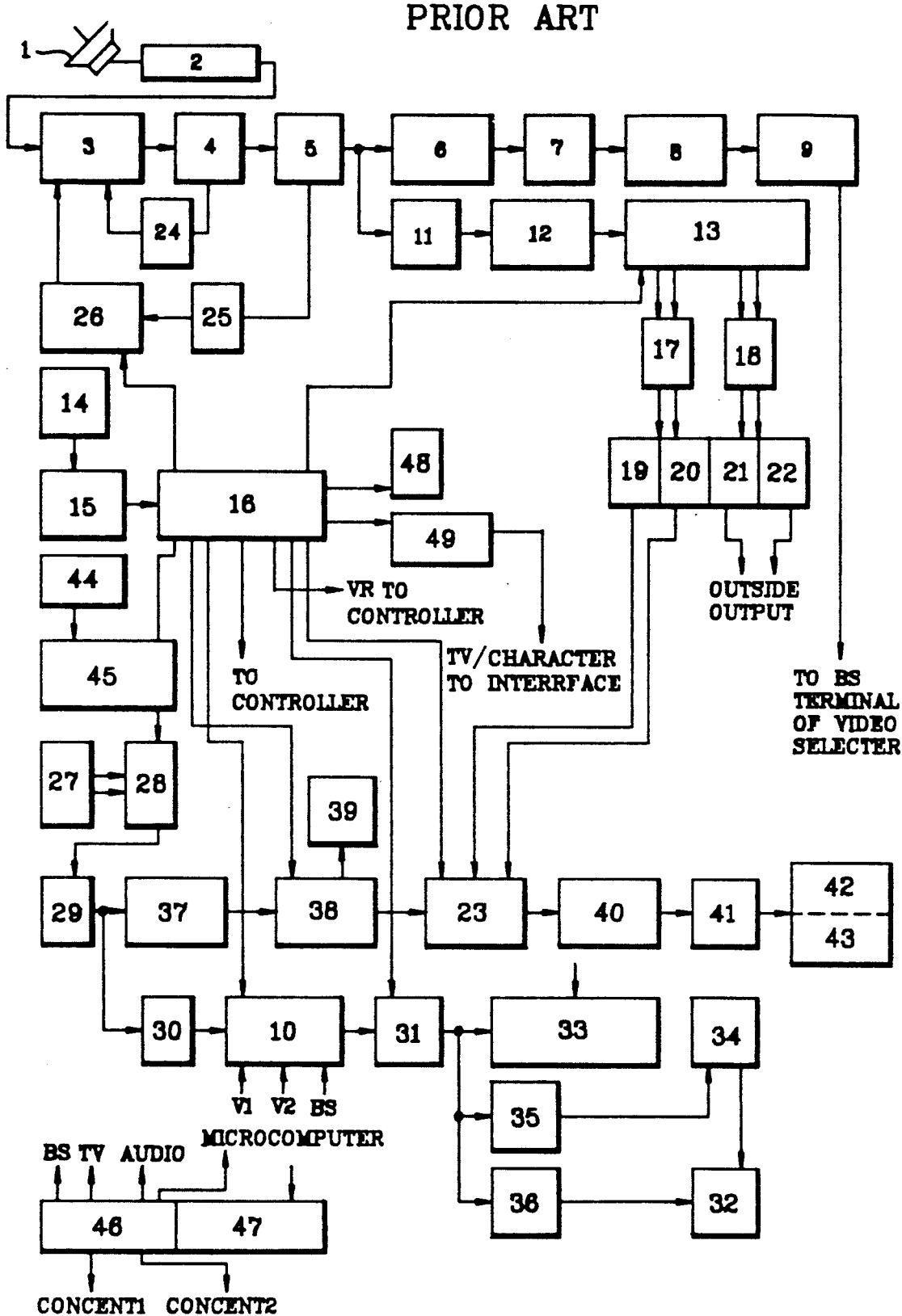
Figure 3:
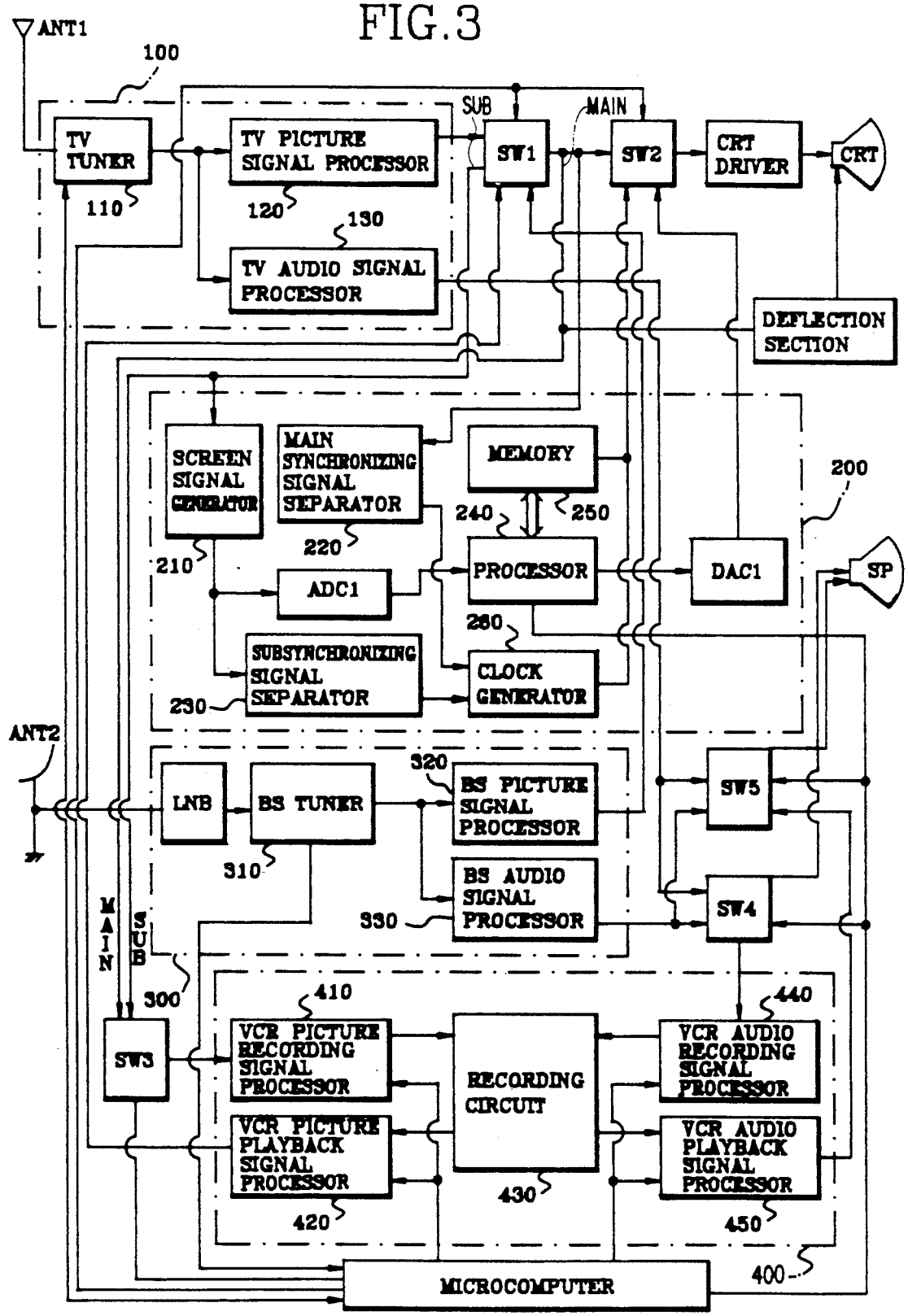
FIG. 3 is a TV receiver with built-in multiple functions according to present invention.

FIG. 3 shows a block diagram of a TV receiver with built-in multiple functions, comprising a TV signal processing section 100 for processing TV signals from a TV tuner 110; a PIP signal processing section 200 for processing PIP signals supplied as signals for a subscreen; a BS signal processing section 300 for processing BS signals from a BS tuner; a VCR signal processing section 400 for processing a VCR signal; a MICOM for controlling all system blocks; switches SW1-SW5 for respectively selecting picture signals for display as the TV main screen display and subscreen display and for selecting corresponding audio signals, according to the control of the MICOM.

The TV signal processing section 100 further includes a TV tuner 110 for tuning TV signals from antenna ANT1, and TV picture processor 120 and audio signal processor 130 for providing TV picture and audio signals, respectively.

The PIP signal processing section 200 includes a screen signal generator 210 for converting a subscreen signal to luminance [Y] and color difference signals [R−Y] and [B−Y]; an analog to digital converter ADC1; a main synchronizing signal separator 220 for extracting synchronizing signals only for a main screen display; a processor 240 for processing a subscreen signal which has been converted into a digital signal by the analog to digital converter ADC1; a memory 250 for memorizing the latter digital subscreen signal; a clock generator 260 for providing clocks synchronous with the main and subscreen synch signals and passing the clocks via SW2 to the CRT driver, thereby locating the subscreen signal to the predetermined location and size; and a digital to analog converter DAC1 for converting a signal of the processor 240 into an analog signal.

There are further included corresponding control signals in a signal which is to be applied to the memory 250 from the clock generator 260.

The BS signal processing section 300 comprises a low noise blockdown converter LNB for lowering the noise component of a BS signal which is received by the BS antenna ANT2; a BS tuner 310 for detecting a signal after channel tuning; a BS picture signal processor 320 for processing BS signals from the BS tuner 310; a BS audio signal processor 330 for processing BS audio signals from the BS tuner 310.

The VCR signal processing section 400 for processing the VCR signal includes a VCR picture recording signal processor 410 capable of processing a desired signal to be recorded; a VCR picture playback signal processor 420 for processing a playback picture signal and for providing the playback picture signal to SW1; a recording section 430 for recording picture and audio signals; a VCR audio recording signal processor 440 for processing audio signals to be recorded on the VCR; and a VCR audio playback signal processor 450 for processing playback audio signals from the VCR. The switch SW1 also selects a subscreen display from among its three inputs under control of the MICOM and sends the subscreen picture signal to the screen signal generator 210 in the PIP processing circuit 200. There the subscreen picture signal is processed and set to switch SW2 where it is combined with the main screen signal input to SW2 under control of clock pulses from clock generator 260, to thereby superimpose the subscreen picture at the correct size and location onto the main screen picture.

The TV main screen selection switch SW1 is The switch SW1 also selects a subscreen display from among its three inputs under control of the MICOM and sends the subscreen picture signal to the screen signal generator 210 in the PIP processing circuit 200. There the subscreen picture signal is processed and set to switch SW2 where it is combined with the main screen signal input to SW2 under control of clock pulses from clock generator 260, to thereby superimpose the subscreen picture at the correct size and location onto the main screen picture coupled to and receives inputs from the TV signal processing section 100, the BS signal processing section 3001, the VCR signal processing section 400, and the MICOM. SW1 is switched according to the control of the MICOM, and thus selects a signal to be displayed on the TV screen as the main screen display by selecting a signal from among the TV picture signal, the BS picture signal, and the playback VCR picture signal.

The subscreen selection switch SW2 is coupled to the TV main screen selection switch SW1, the PIP signal processing section 200, and the MICOM. SW2 selects a signal from among the main screen signal, which is selected from the TV main selection switch SW1 by a clock of clock generator 260, and the subscreen signal which is output from the digital to analog converter DAC1. Thus, a PIP screen is displayed within the TV main screen by selecting the main screen signal and the subscreen signal and using clocks generated from the clock generator 260 and switches causing the PIP function to be ON or OFF according to the control signal of the MICOM, when PIP is switched ON by the control of the MICOM.

The VCR recording signal selection switch SW3 and the audio signal to be supplied to the loud speaker. The selected audio signals are selected from the audio generated in the processor 130 and the audio generated by processor 330. The appropriate signals are selected to correspond to the main screen display on the CRT, or the subscreen display if desired, and to the picture recorded on the VCR. The MICOM controls SW3 to select a signal to be recorded on the VCR. Either the TV main or subscreen signals can be selected according to the control of the MICOM.

The audio output/recording selection switch SW4 is coupled to the TV signal processing section 100, the BS signal processing section 300, and the MICOM. Switch SW4, under control of MICOM selects the audio signal to be recorded on the VCR and the audio signal to be supplied to the loud speaker. The selected audio signals are selected from the audio generated in the processor 130 and the audio generated by processor 330. The appropriate signals are selected to correspond to the main screen display on the CRT, or the subscreen display if desired, and to the picture recorded on the VCR.

The audio output switch SW5 is coupled to the TV signal, the BS signal, and the VCR signal processing sections 100, 300, 400 and to the MICOM. Switch SW5 provides an audio signal corresponding to the TV main and subscreen to loudspeaker SP according to the control of the MICOM.

The preferred embodiment, described above operates as follows.

A TV signal from TV tuner 110 is tuned and applied to TV main screen selection switch SW1 after processing by the TV picture signal processor 120. A BS signal from the BS antenna ANT2 is converted to a lower intermediate frequency after being amplified by low noise blockdown converter LNB. The latter signal is channel tuned by BS tuner 310 and detected as a composite video blanking signal, and thus becomes a BS picture signal after processing by the BS picture signal processor 320. The BS picture signal is applied to the TV main screen selection switch SW1.

If the TV main screen signal is selected by the MICOM to be the TV picture signal from the TV picture signal processor 120 and the TV subscreen signal is selected by the MICOM to be the BS picture signal, the BS picture signal is routed through SW1 to generator 210 to be dematrixed to yield luminance [Y] and color difference signal [R−Y] and [B−Y]. The BS signal thus becomes a PIP signal (i.e. a subscreen signal) after processing by the main synchronizing signal separator 220 and analog to digital converter ADC1 and subsynchronizing signal separator 230 and processor 240 and memory 250 and clock generator 260 and digital to analog converter DAC1, and is switched to subscreen picture signal by the TV subscreen selection switch SW2. Thus the TV picture signal is displayed as the main screen display through the deflection section and CRT driver section and circuit, and the BS signal is displayed as the subscreen display. It will be apparent that any of the three input picture signals applied to SW1 can be selected as the main screen signal and any of the three can be selected as the subscreen signal.

Since the PIP section operates on signals from other sections, a separate tuner is not required for the PIP section. Signals selected to be the main screen signal and subscreen signal are connected by the TV main screen selection switch SW1 to record a subscreen while watching the main screen, and the subscreen signal can be recorded by the VCR via selection switch SW3 and the VCR picture recording signal processor 410.

On the other hand, when it is desirable to record the main screen while simultaneously watching the subscreen, the main screen signal is selected by the MICOM and switch SW3 to be applied to the VCR picture recording signal processor 410.

If a BS picture signal is to be selected as the main screen signal and a TV picture signal is to be selected as a subscreen signal, the processing method is the same as that above, except for a reversal of operation of switches SW1 and SW2.

In the case of playback of a VCR recorded signal, the VCR picture playback signal is coupled to the TV main screen selection switch SW1 through the VCR picture playback signal processor 420. The VCR signal can be displayed on the main screen or on the subscreen. The main or subscreen is displayed after the same procedure as above. The VCR picture playback signal is applied to the PIP signal processing section 200 according to a switching operation of the TV main picture selection switch SW1 by the control of the MICOM and TV picture signal is made to be displayed as a subscreen.

In the case of the audio signals, the TV audio signal which is processed from TV audio signal processor 130 and BS audio signal which is processed from BS audio signal processor 330 are switched by audio output/-recording selection switch SW4 under control of the MICOM, whereby the desired audio signal is output to the loudspeaker SP and an audio signal to be recorded by VCR audio recording signal processor 440 is applied thereto via switch SW4. An audio signal, which has been recorded on the VCR can be output by audio output switch SW5 to speaker SP under the control of the MICOM.

The MICOM, according to the present invention, controls the switching of switch SW1-SW5, whereby the picture and audio signal of the main screen and the subscreen are selected. A PIP signal is selected by the control of TV main and subscreen selection switches SW1 and SW2 and the MICOM and is processed by the PIP signal processing circuit 200, so that a tuner for the PIP is not required.

As described above, a TV with built-in multiple functions according to the present invention has the advantages of being a simple circuit at low cost, while at the same time providing complex functions and incorporating tuners for only TV and BS signals and controlling the whole system with a single MICOM.

What is claimed is:

1. A TV receiver with built-in multiple functions comprising:
   a TV tuner for tuning conventional TV signals;
   a TV signal processing means for processing signals from said TV tuner;
   a PIP signal processing means for processing PIP signals, said PIP signal processing means having a clock generator for generating clock pulses;
   a Bs signal processing means for processing BS signals;
   a VCR signal processing means for processing VCR signals and including a VCR;
   a microcomputer (MICOM) for controlling each said signal processing means;
   TV main screen selection means responsive to control of said MICOM and connected to said TV signal processing means, BS picture signal processing means and VCR signal processing means and said MICOM, for selecting and displaying as the main screen display a signal from among a TV picture signal, a BS picture signal, and a VCR playback signal generated by said TV, BS and VCR signal processing sections, respectively, and for selecting a subscreen signal from among a TV picture signal, a BS picture signal, and a VCR playback signal generated by said TV, BS and VCR signal processing sections, respectively;
   TV subscreen selection means responsive to control of said MICOM and connected to said TV main screen selection means, said PIP signal processing means and said MICOM, for displaying said selected sunscreen signal as a PIP or subscreen display within said TV main screen display, said PIP screen being output to said TV subscreen selection means and read out at a clock rate provided by the clock pulses from said clock generator;
   audio output and recording signal selection means responsive to control of said MICOM and connected to said TV signal processing means, BS signal processing means and said MICOM, for selecting an audio signal to be recorded on said VCR and for providing said audio signal to said VCR signal processing means, said audio signal to be recorded being selected from among the audio signals associated with said TV signal and said BS signal; and
   audio output means responsive to control of said MICOM and connected to said TV signal processing means, said BS signal processing means, said VCR signal processing means, and said MICOM, for providing an audio signal output selected from audio signals associated with said TV signal, said Bs signal, and the audio recorded on said VCR.

2. A TV system comprising:
   a TV signal processing means, including a tuner, for providing conventional TV signals;
   broadcast signal (BS) processing means, including a tuner, for providing BS TV signals;
   a VCR means for recording first TV signals supplied thereto from a selected one of said conventional TV signals and said BS TV signals and for reproducing second TV signals recorded thereon;
   a PIP processing means for receiving one of first and second TV signals and generating PIP SIGNALS therefrom, said PIP processing not having separate tuner means;
   TV display circuitry;
   first switching means connected to receive said conventional TV signals, said BS TV signals, and said second signals for selectively connecting one of said received signals for display on said TV display circuitry as a main screen signal and for selectively connecting one of said received signals to said PIP processing means for processing as a subscreen signal;

second switching means, connected to said first switching means to receive the output therefrom selected as said main screen signal and connected to said PIP processing means to receive said PIP signals, for selectively superimposing said PIP signals as a subscreen signal on a portion of said main screen signal;

third switching means connected to said first switching means for selectively passing one of the main screen signals and subscreen signals to said VCR means for recording thereon; and microcomputer means connected to said first through third switching means for controlling the selection within each said switching means.

* * * * *